United States Patent

[11] 3,585,477

| [72] | Inventor | George A. Shacknow<br>Wayne, N.J. |
|---|---|---|
| [21] | Appl. No. | 784,095 |
| [22] | Filed | Dec. 16, 1968 |
| [45] | Patented | June 15, 1971 |
| [73] | Assignee | The Bendix Corporation |

[54] MOTOR SPEED CONTROL DEVICE INCLUDING FAIL SAFE MONITOR
11 Claims, 2 Drawing Figs.

[52] U.S. Cl..................................................... 318/341,
318/490, 317/13, 340/248
[51] Int. Cl................................................... G08b 21/00
[50] Field of Search.......................................... 318/450,
453, 490, 341; 328/53, 55; 340/248; 317/13, 33,
147

[56] References Cited
UNITED STATES PATENTS

| 3,296,497 | 1/1967 | Slattery | 340/248 X |
| 3,390,387 | 6/1968 | Hugenholtz | 340/248 (P) |
| 3,349,309 | 10/1967 | Dannettell | 318/341 |
| 3,483,455 | 12/1969 | Klysa | 318/490 |

*Primary Examiner*—Oris L. Rader
*Assistant Examiner*—Robert J. Hickey
*Attorneys*—Anthony F. Cuoco and Plante, Hartz, Smith & Thompson

ABSTRACT: A monitor for motor speed control apparatus, and which apparatus affects control by applying pulses of varying frequency to the motor. If the controlling output is a steady state output or if there is an interval monitor failure, a relay is affected for actuating an alarm.

PATENTED JUN 15 1971 3,585,477

INVENTOR.
GEORGE A. SHACKNOW
BY
*Anthony F. Cuoco*
ATTORNEY

MOTOR SPEED CONTROL DEVICE INCLUDING FAIL SAFE MONITOR

BACKGROUND OF THE INVENTION

1. Field of the Invention

This invention relates to monitors for motor speed control apparatus and, more particularly, to monitors for apparatus controlling motor speed with pulses of varying frequency.

2. Description of the Prior Art

Automatic control systems for aircraft include motors for actuating aircraft trim surfaces. The speed of the motors must be controlled for adequate handling of the craft. Monitors are required for the speed control apparatus because erroneous speeds adversely effect aircraft handling and compromise safety requirements.

SUMMARY OF THE INVENTION

This invention contemplates a pulse generator for providing pulses of varying frequency and a modulator for shaping the pulses into a square waveform. A motor is connected to the modulator so that motor speed varies as a function of pulse frequency. A monitor samples the modulator output and if a steady state output rather than a pulse output is provided, or if a monitor component failure occurs, a relay actuates an alarm.

One object of this invention is to provide pulses at varying frequencies for controlling motor speed and to detect a loss of said pulses.

Another object of this invention is to provide monitor apparatus for detecting active and passive failures in the pulse providing means. An active failure occurs when said means provides a steady state output and a passive failure occurs when no output at all is provided.

Another object of this invention is to detect internal monitor failures.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
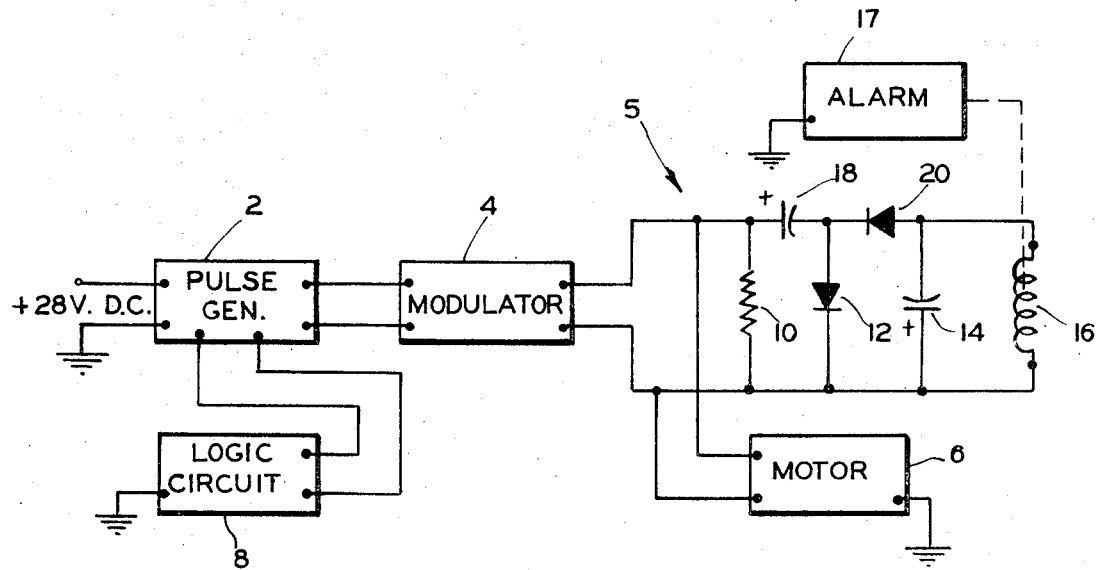
FIG. 1 is an electrical circuit diagram showing a monitor for motor speed control apparatus according to the invention.
Figure 2:
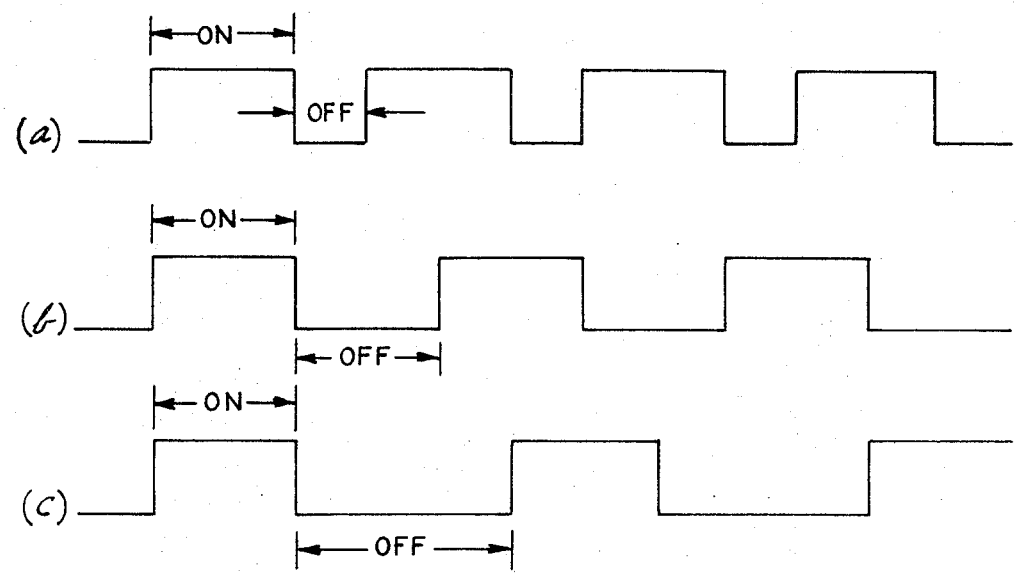
FIG. 2 is a graphical representation showing pulses of varying frequency for controlling motor speed in accordance with the invention.

With reference to FIG. 1, a pulse generator 2 is connected to a +28 volt DC supply and provides pulses having a varying frequency. Pulse generator 2 is manually operated or operated by a logic circuit 8 so that pulse frequency is varied by varying the pulse "off" time in accordance with a predetermined program. A modulator 4 is connected in series with pulse generator 2 and shapes the pulses to provide square wave pulses having a constant "on" time and a varying "off" time as shown in FIG. 2, (a), (b) and (c).

A motor 6 is connected to modulator 4 and the speed of motor 6 is controlled by the pulse output from the modulator. Motor 6 may be of the type used in an automatic control system such as in the present example where the motor automatically actuates an aircraft trim surface.

Motor speed control by pulses of varying frequency is well known in the art and is explained at Chapter 37, page 475, of Transistor Circuit Design prepared by the Engineering Staff of Texas Instruments, Inc. and published in 1963 by the McGraw Hill Book Company, Inc. It should be noted that for purposes of the present invention, the speed control is achieved by varying the "off" time of the pulses with the "on" time remaining constant as heretofore noted with reference to FIG. 2, (a), (b) and (c). This is necessary because if the pulse "on" time were varied, a condition might arise where the "on" time would be so small in relation to the motor response time that the desired speed control would not be accomplished.

The fail safe monitor of the present invention is designated generally in FIG. 1 by the numeral 5 and includes a resistor 10, a diode 12, a capacitor 14 and a relay 16 connected in parallel with modulator 4, and a capacitor 18 connected in series with modulator 4 and connected intermediate resistor 10 and diode 12 and a diode 20 connected in series with modulator 4 and connected intermediate diode 12 and capacitor 14.

During the "on" time of the pulses from modulator 4, diode 12 conducts and provides a path for capacitor 18 to charge. During the "off" time of the pulses shown in FIG. 2, (a), (b) and (c), capacitor 18 discharges causing capacitor 14 to charge through diode 20 and through the load of modulator 4. Relay 16 is energized by the voltage across capacitor 14 and represents the only discharge path for capacitor 14. A safe condition is indicated when relay 16 is energized and a failure is indicated when relay 16 is deenergized.

During the "on" time of the pulses shown in FIG. 2, (a), (b) and (c), diode 12 causes capacitor 18 to charge to the level of the pulse output from modulator 4 and during the "off" time of the pulses capacitor 18 discharges to charge capacitor 14 and energize relay 16. Diode 20 isolates capacitor 14 and relay 16 so that the only discharge path for capacitor 14 is through relay 16.

An active failure, i.e. a steady state output rather than a pulse output provided by modulator 4, applies the full +28 volt DC supply voltage to monitor 5. Capacitor 18 blocks the DC voltage and capacitor 14 discharges through relay 16 causing relay 16 to deenergize and to operate an alarm 17. A passive failure, i.e. no output provided by modulator 4, causes capacitor 14 to discharge through relay 16 with relay 16 deenergizing to operate alarm 17.

The device of the present invention is fail safe in that it can detect an open or short circuit failure of the components in monitor 5. Thus, if capacitor 18 is open or shorted, it cannot store the 28 volt DC supply voltage and capacitor 14 will not charge during the "off" time of the pulses shown in FIG. 2. If resistor 10 is open, the discharge path from capacitor 18 to capacitor 14 deteriorates. If resistor 10 is shorted, the pulse is destroyed and the circuit behaves the same as if a passive failure occurred. When diode 12 is open, capacitor 18 is prevented from charging, and a short in diode 12 causes capacitor 18 to discharge through the short circuit. If diode 20 opens, a loss in the discharge path from capacitor 18 to capacitor 14 occurs and if diode 20 shorts, capacitor 14 and relay 16 are no longer isolated and capacitor 14 will immediately discharge. When capacitor 14 is open or shorted, the capacitor cannot store the +28 volt DC voltage and relay 16 deenergizes. If relay 16 opens or shorts, it will likewise deenergize to indicate a failure.

SUMMARY OF THE INVENTION

Active Failures

An active failure causes the output of modulator 4 to become a steady state DC voltage. Capacitor 18 blocks this DC voltage and relay 16 deenergizes to operate alarm 17 for indicating a failure.

Passive Failure

A passive failure causes the output of modulator 4 to drop to zero volts and relay 16 deenergizes to operate alarm 17 for indicating a failure.

Monitor Component Failures

If capacitor 18 opens or shorts, it will not be able to hold a charge and relay 16 deenergizes. If diode 12 opens there will be no return path for the pulse from modulator 4, capacitor 18 will not charge and relay 16 deenergizes. If diode 12 shorts, capacitor 14 will not charge and relay 16 deenergizes.

If diode 20 opens, the charge path from capacitor 18 to capacitor 14 is lost. If diode 20 shorts, capacitor 14 discharges through motor 6 rather than through relay 16. Both of the aforenoted conditions deenergize relay 16.

If capacitor 14 opens or shorts, relay 16 deenergizes. If relay 16 opens or shorts, it deenergizes. If prior to engagement of the monitor any of the aforementioned failures occur, alarm 17 will indicate a failure when system power is turned on.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What I claim is:

1. For a system including a motor, a motor speed control means in combination with a monitor, comprising:
    a pulse source for providing pulses of varying frequency and including means for effecting said pulses so that they have a constant on time and a varying off time;
    means connected to the pulse source for shaping the pulses therefrom;
    the motor connected to the pulse shaping means so that the speed of the motor corresponds to the frequency of the pulses therefrom;
    the monitor connected to the pulse shaping means for detecting a loss of said pulses and for thereupon activating an alarm, said monitor including;
    a resistor, a first current flow control device, a first capacitor and switching means connected in parallel with the pulse shaping means;
    a second capacitor connected in series with the pulse shaping means and connected intermediate the resistor and the first current flow control device; and
    a second current flow control device connected in series with the pulse shaping means and connected intermediate the first current flow control device and the first capacitor.

2. Apparatus as described by claim 1 wherein:
    the first current flow control device is conductive during the on time of the pulses from the pulse shaping means for providing a path for the second capacitor to charge; and
    the second capacitor discharges during the off time of said pulses causing the first capacitor to charge through the second current flow control device and the load of the pulse shaping means.

3. Apparatus as described by claim 2, wherein:
    the switching means is energized by the voltage across the first capacitor; and
    a loss of said voltage causing the switching means to deenergize for activating the alarm.

4. Apparatus as described by claim 3, wherein:
    the second current flow control device is effective for isolating the first capacitor and the switching means so that the only discharge path for said first capacitor is through the switching means.

5. Apparatus as described by claim 4, wherein:
    a steady state output provided by the pulse shaping means is blocked by the second capacitor causing the first capacitor to discharge through the switching means for deenergizing the switching means to actuate the alarm.

6. Apparatus as described by claim 5, wherein:
    a zero output provided by the pulse shaping means causes the first capacitor to discharge through the switching means for deenergizing the switching means to actuate the alarm.

7. Apparatus as described by claim 2, wherein:
    a failure in the second capacitor renders said second capacitor ineffective for storing a charge and for discharging to the first capacitor during the off time of the pulses from the pulse shaping means, whereupon the first capacitor will not charge during said off time.

8. Apparatus as described by claim 6, wherein:
    an open second current flow control device destroys the discharge path from the second capacitor to the first capacitor; and
    a shorted second current flow control device destroys the isolation of the first capacitor and the switching means.

9. Apparatus as described by claim 2, wherein:
    an open first diode prevents the second capacitor from charging; and
    a shorted first diode causes the second capacitor to discharge through the short.

10. Apparatus as described by claim 9, including:
    said resistor being open destroying the discharge path from the second capacitor to the first capacitor; and
    said resistor being shorted providing zero input to the monitor.

11. Apparatus as described by claim 2, wherein:
    a failure in the first capacitor renders said capacitor ineffective for storing a charge whereupon the switching means is deenergized.